Patented Feb. 28, 1950

2,499,187

UNITED STATES PATENT OFFICE 2,499,187

POLYMERS OF 2-VINYLDIBENZOTHIOPHENE

Ralph G. Flowers and Leola W. Flowers, Pittsfield, Mass., assignors to General Electric Company, a corporation of New York No Drawing. Application June 17, 1948,
Serial No. 33,675

12 Claims. (Cl. 260—79.7)

This invention relates to polymers and copolymers of vinyl compounds and to methods of preparing the same. More particularly, the invention is concerned with new and useful compositions of matter comprising the product of polymerization of a mass comprising 2-vinyldibenzothiophene.

In our copending application Serial No. 33,674 filed concurrently herewith, and assigned to the same assignee as the present invention, there are disclosed and claimed 2-vinyldibenzothiophene and methods of preparing the same. We have now discovered that this monomeric material may be polymerized or copolymerized with other polymerizable compositions to yield valuable and useful compositions of matter.

As described in the above-mentioned application, 2-vinyldibenzothiophene may be prepared by first acetylating dibenzothiophene with an acetylating agent, for example, acetic acid or anhydride, acetyl chloride or bromide, ketene, etc., to obtain 2-acetyldibenzothiophene. It is, of course, understood that by further acetylating the monoacetyldibenzothiophene, it is possible to prepare polymerizable divinyldibenzothiophenes from diacetyldibenzothiophenes by employing the same method as that used for preparing the monovinyldibenzothiophene from monoacetyldibenzothiophene. The acetylated dibenzothiophene is then reduced or hydrogenated to form a hydroxyethyldibenzothiophene which may then be dehydrated by contacting it with a dehydration catalyst to obtain the monovinyldibenzothiophene, more specifically, 2-vinyldibenzothiophene, which has a melting point of 45.0° to 45.5° C.

Various methods of polymerizing the monomeric 2-vinyldibenzothiophene, either by itself or with other copolymerizable materials, may be employed, the more desirable method depending largely upon the properties desired in the final composition. For example, the monomer, either by itself or with other copolymerizable materials, may be dissolved in a suitable inert solvent, for example, an aromatic hydrocarbon solvent (such as benzene, toluene, xylene, etc.) which is also a solvent for any other members of the mixture.

A small amount of solvent has little retarding effect upon, and in some cases actually accelerates, the polymerization of the monomer or monomers. A moderately large amount of solvent tends to yield polymers and copolymers of short chain lengths and often results in a longer period of induction so that even when very active catalysts, such as boron trifluoride, are used, a period of time elapses between the addition of the catalyst and the beginning of the polymerization. This tendency is particularly marked when the polymerization is carried out at elevated temperatures. A very large amount of solvent often inhibits or retards the polymerization of the monomer or comonomers to the extent that polymerization is not effected in a reasonable time.

Another method which has been found effective in preparing the homopolymers and copolymers of the instant claimed invention includes the preparation of an intimate mixture of the monomeric materials by preparing a suspension or emulsion of the monomer or monomers in a liquid medium as, for example, water.

With specific regard to the polymerization of the monomer, 2-vinyldibenzothiophene itself, it may be said that the readiness and speed of the polymerization depend upon the purity of the latter. The purer the monomer, the greater is the ease and rate of polymerization and the higher the molecular weight of the polymer. The physical properties of the homopolymer are, to a large extent, dependent upon the polymerization. For example, polymerizations carried out at high temperatures at a very rapid rate usually result in polymers of low molecular weight. In order to attain suitable polymerization products, careful control of the polymerization reaction is necessary.

In producing the claimed homopolymer or copolymers, the polymerization of the monomer or monomeric materials may be carried out by means of heat alone, or it may be accelerated by means of vinyl polymerization catalysts usually employed for the purpose. Examples of such polymerization catalysts are oxygen, ozone, ozonides, hydrogen peroxide, organic and inorganic acids and acidic substances, e. g., hydrochloric acid, hydrofluoric acid, sulfuric acid, boron fluoride, stannic chloride, antimony pentachloride, the halogens, etc.; organic and inorganic peroxides, for instance, peroxides of the aromatic acid series, e. g., benzoyl peroxide, tertiary butyl perbenzoate, etc.; peroxides of the aliphatic acid series, for example, tertiary butyl hydroperoxide, acetyl peroxide, stearyl peroxide, lauryl peroxide, etc.; sodium peroxide, barium peroxide, etc.; various per- compounds such as the persulfates, perchlorates, perborates, etc. Heat, light (ultraviolet light) or heat and light may be used with or without a polymerization catalyst in accelerating the polymerization.

Where a catalyst is employed for accelerating the polymerization, the catalyst concentration may be varied, for example, within the range of from 0.05 to 3 or 4 per cent or more, by weight, of the polymerization mixture including the solvent or suspension or emulsion medium if such are employed. Where no such media are employed and the monomers or polymers are employed alone, we have found it advantageous to use from 0.1 to 2 per cent of the catalyst based on the weight of the total weight of the monomer or monomers used.

The most effective temperatures at which the polymerization may be effected lie within the range of from about 30° to 120° C. depending upon the presence or absence of solvents, the type of polymerizable materials employed, and the properties desired in the finally polymerized product. Greater polymerization speeds are obtainable at higher temperatures but this usually results in an undesirable reduction in the molecular weight of the finally polymerized product. It is usually advantageous to displace the air in the polymerizable systems and in the free space above the same with an inert atmosphere, for example, nitrogen or carbon dioxide.

The homopolymers of this invention possess, in general, the physical properties of polystyrene except that the softening point of the homopolymer is considerably higher than the softening point of polystyrene. The electrical properties of the homopolymer likewise compare to those of polystyrene, making it valuable for use in electrical insulation. The homopolymers can, in general, be treated in the same manner as any other thermoplastic material. They may be cast, pressed, extruded, rolled, machined and injection- or pressure-molded. The monomeric 2-vinyldibenzothiophene, because of its high boiling point, is especially valuable as a solventless varnish or impregnating medium and can be employed in processes involving the use of vacuum without undue loss of the monomer by vaporization.

The homopolymer is, in general, compatible with the same materials as polystyrene. For example, it may be plasticized by the same plasticizers where softening point and strength are of secondary importance. Materials simulating synthetic elastic products may be prepared from these homopolymers by adding relatively large amounts of plasticizers.

The monomeric 2-vinyldibenzothiophene may be copolymerized with a great number of copolymerizable $CH_2=C<$-containing compounds. Examples of such compositions of matter are dienes, e. g., butadiene, isoprene, piperylene, etc.; a vinyl-substituted aromatic hydrocarbon, e. g., styrene, methyl styrene, divinyl benzene, vinyl fluorenes; acenaphthylene, etc.; acrylic acid and its derivatives, e. g., methacrylic acid, acrylonitrile, acrylamide, methacrylonitrile, methacrylamide, esters of acrylic and methacrylic acids, for example, methyl acrylate, ethyl acrylate, methyl methacrylate, etc.; and ethylenically unsaturated halogenated or unhalogenated aliphatic hydrocarbon, e. g., ethylene, chloroethylenes, fluoroethylenes, chlorofluoroethylenes, etc., and the like.

The copolymerization products of the present invention may be varied in accordance with the nature of the copolymerizable ingredient or ingredients which are copolymerized with the 2-vinyldibenzothiophene. The proportions of the copolymerizable monomers may be varied within broad limits. Although the proportions, by weight, ordinarily will be within the range of from 10 to 90 per cent of the 2-vinyldibenzothiophene to 90 to 10 per cent of the other monomer or monomers, we do not intend to be limited to such range since other proportions of the 2-vinyldibenzothiophene and the other copolymerization ingredient or ingredients may be higher or lower, for instance, from 1 to 99 per cent, by weight, of the 2-vinyldibenzothiophene, to from 99 to 1 per cent, by weight, of the other monomeric material or materials. We may preferably employ a copolymerizable mixture containing, by weight, from 1 to 75 per cent of the 2-vinyldibenzothiophene based on the total weight of the copolymerizable ingredients.

2-vinyldibenzothiopene can be cross-linked by compounds such as divinyl and diallyl compounds, e. g., divinyl and diallyl esters of diethylene glycol, to form products that have increased heat resistance and can be readily machined and worked. Such products tend toward insolubility and infusibility as the per cent of the divinyl or diallyl compound is increased. The copolymers of 2-vinyldibenzothiophene with other vinyl compounds containing only one $CH_2=C<$ grouping, many examples of which have been given previously, are thermoplastic and can be treated, in general, as any thermoplastic material since they can be injection- or compression-molded, cast into films, oriented and fused.

In order that those skilled in the art may better understand how the present invention may be practiced, the following examples are given by way of illustration and not by way of limitation. All parts are by weight.

Example 1

Ten parts 2-vinyldibenzothiophene were dissolved in forty parts benzene and the latter solution mixed with 1 part boron trifluoride etherate solution. The mixture heated up spontaneously and after five minutes the benzene solution was diluted with methyl alcohol to precipitate an almost quantitative yield of a white homopolymer of 2-vinyldibenzothiophene.

Example 2

A sample of the pure monomeric 2-vinyldibenzothiophene was placed in a 125° C. oven for 40 hours. At the end of this time there was obtained a hard, brittle mass. This polymer was broken up into small particles and molded into the form of a disk at a temperature of 150° C. and a pressure of 20,000 lbs. p. s. i. Electrical measurements of this disk showed it to have a dielectric constant of 2.18 and a power factor of 0.11 per cent at 1 megacycle.

Example 3

Ten parts 2-vinyldibenzothiophene and 1 part benzoyl peroxide were dissolved in fifty parts benzene and heated for 16 hours in an oil bath at 100° C. Upon dilution of the benzene solution with methyl alcohol, there were precipitated about 6 parts of a white polymer which had a softening point of about 194° C.

Example 4

In this example the same proportions and procedure were employed as in Example 3 with the exception that 1 part tertiary butyl hydroperoxide was used in place of the 1 part benzoyl peroxide. There was thus obtained upon dilution of the benzene solution with methyl alcohol a white polymer having a softening point of about 215° C.

Example 5

Ten parts 2-vinyldibenzothiophene and 1 part tertiary butyl perbenzoate were added to 50 parts benzene and the mixture heated for 16 hours in an oil bath at 100° C. A quantitative yield of ten parts of the homopolymer was obtained upon dilution of the benzene solution with methyl alcohol. The homopolymer had a softening point of approximately 215° C.

Example 6

Ten parts 2-vinyldibenzothiophene and ten parts vinyl acetate were dissolved in fifty parts benzene, and 1 part benzoyl peroxide was added to the said solution. The entire mass was heated for 21 hours in an oil bath at 100° C. Methyl alcohol was thereafter added to the benzene solution to precipitate a copolymer (softening point 196° C.) of the aforementioned monomeric materials in about a 70 per cent yield.

Example 7

In this example 10 parts 2-vinyldibenzothiophene and ten parts acenaphthylene, together with 1 part benzoyl peroxide, were added to fifty parts benzene and the total mixture heated for 22 hours in an oil bath at 100° C. Dilution of the benzene solution with methyl alcohol gave a quantitative yield of a copolymer of the foregoing two monomers which had a softening point of over 220° C.

Example 8

Ten parts 2-vinyldibenzothiophene and 10 parts styrene were dissolved in fifty parts benzene to form about a 28 per cent solution of the two monomers. About 0.05 per cent, by weight, benzoyl peroxide, based on the total weight of the monomers, was then added and the mixture heated for 21 hours at 100° C. Dilution of the benzene solution with methyl alcohol precipitated about 16 parts of a white copolymer having a softening point of around 174° C.

Example 9

Ten parts 2-vinyldibenzothiophene and ten parts N-vinylphthalimide were dissolved in fifty parts benzene, and 1 part tertiary butyl perbenzoate was added to the mixture. The total mass was heated for 22 hours at 100° C. in an oil bath. There was thus obtained 14 parts of the copolymer (softening point above 220° C.) which was only slightly soluble in the benezene.

Example 10

Ten parts 2-vinyldibenzothiophene and ten parts vinyl carbazole were dissolved in fifty parts benzene, and 1 part tertiary butyl perbenzoate was added to the solution. The total mixture was heated at 100° C. for 22 hours. About 18 parts white copolymer (softening point above 220° C.) were obtained upon dilution of the benzene solution with methyl alcohol.

Example 11

A benzene insoluble product was obtained when ten parts 2-vinyldibenzothiophene and ten parts acrylonitrile were heated together with 1 part tertiary butyl perbenzoate in fifty parts benzene for 21 hours at 100° C. This copolymer had a softening point above 220° C.

Example 12

In a similar manner, but preferably using an emulsion polymerization process, butadiene-1,3 may be copolymerized with 2-vinyldibenzothiophene to yield copolymers having certain desirable properties depending upon the proportions of the ingredients. As the ratio of the butadiene-1,3 to 2-vinyldibenzothiophene increases, the resulting copolymers tend to become more tough and rubbery.

The polymers and copolymers of this invention may, in general, be modified to fill the requirements of specific applications for which they may not ordinarily be suitable. For example, plasticizers and fillers may be added to the monomer or mixtures of monomers prior to polymerization thereof or they may be added after the polymerization has been completed.

In general, plasticizers commonly used for polymers and copolymers known to the art may be employed in plasticizing the polymeric materials embraced by this invention. The selection of the proper plasticizers depends largely upon the properties desired in the final product. Useful molding compositions may also be prepared by mixing the homopolymers or copolymers with suitable fillers, such as, for example, alpha cellulose, mica dust, titanium dioxide, talc, zinc oxide, magnesium oxide, asbestos, quartz, wood flour, cellulose, or wool fibers, etc.

Various polymerizable compounds in addition to those heretofore specifically mentioned may be simultaneously polymerized or copolymerized with the 2-vinyldibenzothiophene to obtain new and useful synthetic compositions, for instance, any compound containing a polymerizable $CH_2=C<$ grouping in its molecular structure, that is, compounds containing a single $CH_2=C<$ grouping or a plurality (two, three, four or more) of $CH_2=C<$ groupings in the structure of the individual compound. Examples of such compounds are the esters, nitriles and amides of acrylic and α-substituted acrylic acids, vinyl esters and halides, methylene malonic esters, mono- and poly-allyl compounds, e. g., the di-, tri-, tetra- (and higher) allyl derivatives. For instance, the copolymerizable material may be a polyallyl ester of an inorganic polybasic acid, of a saturated or unsaturated aliphatic polycarboxylic acid or of an aromatic polycarboxylic acid. Specific examples of compounds that may be employed, in addition to those hereinbefore mentioned, are:

Benzyl acrylate
Benzyl methacrylate
Methyl alpha-chloroacrylate
Ethyl alpha-bromoacrylate
Propyl alpha-chloroacrylate
Para-chlorostyrene
Allyl acrylate
Allyl methacrylate
Tetra-allyl silane
Methallyl acrylate
Di- and tri-chlorostyrenes
Chlorinated divinylbenzenes
Vinyl methyl ether
Vinyl ethyl ether
Divinyl ether
Methylene methyl malonate
Methylene ethyl malonate
Vinyl chloride
Vinylidene chloride
Diethylene glycol dimethacrylate (diethylene dimethacrylate)
Glyceryl triacrylate
Ethylene glycol diacrylate (ethylene diacrylate)
Diethylene itaconate
Diethyl maleate
Dimethyl fumarate
Para-chlorobenzyl acrylate
Diallyl fumarate
Diethyl itaconate
Diallyl citraconate
Divinyl biphenyl
Vinyl methyl ketone
Cyclopentadiene
2-chloro-butadiene-1,3 (chloroprene)
2,3-dimethyl-butadiene-1,3
Chlorinated methylstyrenes
Chlorinated vinylnaphthalenes
Hexadiene-1,5
Octadiene-1,4
2-cyano-butadiene-1,3
Dimethallyl maleate
Dimethallyl itaconate
Dimethallyl phthalate
Amyl acrylate
Hexyl methacrylate
Triallyl citrate
Triallyl aconitate
Vinyl acetate
Vinyl propionate
Vinyl butyrate The homopolymer or copolymers of this invention have a wide variety of commercial applications. They may be used alone or in combination with other insulating materials, for example, paper, fabric materials formed of glass fibers, cotton, silk, rayon, nylon, etc., sheet asbestos, cellulose esters (e. g., cellulose acetate, cellulose acetobutyrate, etc.), cellophane, etc., as dielectric materials in electrical apparatus. For instance, capacitors and other electrical devices may contain a dielectric material comprising the products of polymerization of a polymerizable mass containing 2-vinyldibenzothiophene as an essential ingredient.

Paper-insulated capacitors wherein paper impregnated with a composition comprising a polymer or copolymer of 2-vinyldibenzothiophene constitutes the dielectric material is a more specific example of the use of a composition of our invention in electrical applications. Our new polymers and copolymers may also be employed as cable impregnants, in impregnating electrical coils, as filling compound in potheads and cable joints, and in numerous other electrical applications. The device to be treated may be impregnated or filled with the polymerizable mixture (for example, the monomer, mixture of monomers, mixture of partial polymers or copolymers, or mixture of monomer and partial polymer), and polymerization effected in situ.

What we claim as new and desire to secure by Letters Patent of the United States is:

1. A polymer of 2-vinyldibenzothiophene.
2. A homopolymer of 2-vinyldibenzothiophene.
3. An interpolymer of (1) 2-vinyldibenzothiophene and (2) a different $CH_2=C<$-containing compound which is copolymerizable with the 2-vinyldibenzothiophene.
4. An interpolymer of (1) 2-vinyldibenzothiophene and (2) styrene.
5. An interpolymer of (1) 2-vinyldibenzothiophene and (2) vinyl acetate.
6. An interpolymer of (1) 2-vinyldibenzothiophene and (2) a different $CH_2=C<$-containing compound which is copolymerizable with the 2-vinyldibenzothiophene, the former comprising from 1 to 75 per cent, by weight, of the total weight of the interpolymer.
7. An interpolymer of (1) 2-vinyldibenzothiophene and (2) styrene, the 2-vinyldibenzothiophene comprising from 1 to 75 per cent, by weight, of the total weight of the interpolymer.
8. An interpolymer of (1) 2-vinyldibenzothiophene and (2) vinyl acetate, the 2-vinyldibenzothiophene comprising from 1 to 75 per cent, by weight, of the total weight of the interpolymer.
9. The process for preparing a 2-vinyldibenzothiophene polymer which comprises heating a polymerizable mass comprising 2-vinyldibenzothiophene in the presence of a vinyl polymerization catalyst.
10. The process for preparing a homopolymer of 2-vinyldibenzothiophene which comprises heating 2-vinyldibenzothiophene in the presence of a vinyl polymerization catalyst at a temperature of from 30° to 120° C.
11. The process for preparing an interpolymer of 2 - vinyldibenzothiophene and a different $CH_2=C<$-containing compound which is copolymerizable with the 2 - vinyldibenzothiophene, which process comprises heating a mixture comprising the two foregoing monomeric materials in the presence of a vinyl polymerization catalyst.
12. The process as in claim 11 wherein the vinyl polymerization catalyst is benzoyl peroxide.

RALPH G. FLOWERS.
LEOLA W. FLOWERS.

REFERENCES CITED

The following references are of record in the file of this patent:

FOREIGN PATENTS

| Number | Country | Date |
|--------|---------|------|
| 487,604 | Great Britain | June 22, 1938 |
| 601,568 | Great Britain | May 7, 1947 |

OTHER REFERENCES

Kuhn, Annalen der Chemie Band 547 Heft 3 June 18, 1941, page 294.

Frank, Ind. and Eng. Chem. March 1948, pages 420–422.